United States Patent
Kailas

(10) Patent No.: US 7,484,075 B2
(45) Date of Patent: Jan. 27, 2009

(54) METHOD AND APPARATUS FOR PROVIDING FAST REMOTE REGISTER ACCESS IN A CLUSTERED VLIW PROCESSOR USING PARTITIONED REGISTER FILES

(75) Inventor: Krishnan K. Kailas, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 10/320,150

(22) Filed: Dec. 16, 2002

(65) Prior Publication Data

US 2004/0117597 A1      Jun. 17, 2004

(51) Int. Cl.
  *G06F 9/30*    (2006.01)
(52) U.S. Cl. ...................................... 712/24
(58) Field of Classification Search ............... 712/213, 712/210, 24; 711/214
  See application file for complete search history.

(56) References Cited

U.S. PATENT DOCUMENTS

| | | | | |
|---|---|---|---|---|
| 5,233,696 A | * | 8/1993 | Suzuki | 712/204 |
| 5,809,273 A | * | 9/1998 | Favor et al. | 712/210 |
| 5,857,083 A | * | 1/1999 | Venkat | 710/314 |
| 5,991,863 A | * | 11/1999 | Dao et al. | 711/219 |
| 6,044,455 A | * | 3/2000 | Hara | 712/213 |
| 6,167,503 A | * | 12/2000 | Jouppi | 712/23 |
| 6,260,134 B1 | * | 7/2001 | Zuraski et al. | 712/210 |
| 6,282,585 B1 | * | 8/2001 | Batten et al. | 710/5 |
| 6,367,006 B1 | * | 4/2002 | Tran | 712/244 |
| 6,615,338 B1 | * | 9/2003 | Tremblay et al. | 712/24 |
| 6,766,440 B1 | * | 7/2004 | Steiss et al. | 712/218 |
| 7,003,649 B2 | * | 2/2006 | Krishnan | 712/213 |

OTHER PUBLICATIONS

Tanenbaum, Andrew S. "Structured Computer Organization" Prentice-Hall, Inc. Second edition, 1984. pp. 10-12.*
Krishnan K. Kailas, "Microarchitecture and Compilation Support for Clustered Instruction-level Parallel Processors", Dissertation submitted to the Faculty of the Graduate School of the University of Maryland, College Park in partial fulfillment of the requirements for the degree of Doctor of Philosophy, 2001.

* cited by examiner

*Primary Examiner*—David J Huisman
*Assistant Examiner*—Jacob Petranek
(74) *Attorney, Agent, or Firm*—Robert M. Trepp; F.Chau & Associates, LLC

(57) ABSTRACT

Effective remote register file access time can be reduced in a clustered VLIW processor using partitioned register files and some additional hardware for pre-fetching remote registers. An instruction pre-fetcher and an instruction pre-decoder is used for pre-fetching and partially decoding instructions in order to pre-fetch the remote registers required for executing VLIWs at run-time, thus substantially reducing the number of inter-cluster copy instructions. The instructions (VLIWs) are scheduled taking into account the various hardware constraints such as limited inter-cluster communication bandwidth, inter-cluster communication delay, etc.

20 Claims, 3 Drawing Sheets

METHOD AND APPARATUS FOR PROVIDING FAST REMOTE REGISTER ACCESS IN A CLUSTERED VLIW PROCESSOR USING PARTITIONED REGISTER FILES

TECHNICAL FIELD

The field of the invention is that of register files for clustered Very Long Instruction Word (VLIW) processors, and in particular to partitioned register files in which the register name space is partitioned and assigned to local register files associated with each cluster.

BACKGROUND OF THE INVENTION

The basic operations carried out by a processor are reading data, computing, and writing data as specified by sequences of instructions in a program. The data read or written by a processor are usually stored in variety of storage media such as disks, memory, cache, or registers. A significant portion of the instructions in the instruction set of a processor access data stored in registers, which is the default location for the most frequently used data.

A typical register file consists of an array of registers for storing a specific type of data such as integer and floating-point. The instructions executed by a processor use many on-chip resources such as function units, registers, buses, cache, etc in order to carry out computations specified by the instruction sequences in the program. In a Very Long Instruction Word (VLIW) processor, a compiler (instead of hardware) is used for statically scheduling instructions, and keeping track and reserving resources used by the instructions. A VLIW consists of a set of instructions that can be issued in the same cycle for parallel execution taking advantage of the instruction-level parallelism (ILP) in the program. In a clustered VLIW processor, the on-chip resources are divided into a number of clusters. In a typical clustered VLIW processor, each cluster may contain a subset of function units, a local register file and a local cache. Often the intermediate results of computation produced in a cluster are needed in the same cluster as well as other clusters. Inter-cluster copy instructions are used when such data needs to be transferred to a different cluster(s). Such inter-cluster copy instructions make use of interconnect structures such as shared or point-to-point inter-cluster communication buses.

The register files used in a clustered processor are either partitioned or replicated register files. In the replicated register file scheme, each local register file shares the entire architected register name space, necessitating inter-cluster copy operations to maintain coherency among local register files. On the other hand, in a partitioned register file scheme, the register name space is partitioned and allocated to a set of physically separate register files associated with each cluster. Partitioned register files have been used as local register files in clusters, especially in clustered VLIW processors, for more than a decade, mainly for reducing the number of ports.

The main advantages in using partitioned register files with smaller number of ports compared to a single centralized register file are reduction in area, access delays and power. However, all the advantages due to clustering, in particular when partitioned register files are used, comes at the cost of reduced performance due to the following: 1. increase in the execution time of programs due to inter-cluster copy instructions that are needed to move data between partitioned register files, and 2. increase in code size due to he extra inter-cluster copy instructions that are to be inserted in the program. A summary of relevant related art in partitioned register files for VLIW processors is described below. The article by R. P. Colwell et al. entitled "A VLIW Architecture for a Trace Scheduling Compiler" in proceedings of the second International Conference on Architectural Support for Programming Languages and Operating Systems (ASPLOS II) in SIGPLAN Notices, vol. 22, no. 10, pp.180-192, October 1987 describes a VLIW processor with partitioned register files.

Explicit inter-cluster copy operations are scheduled by the compiler for accessing registers from a remote cluster. A. Capitanio, N. Dutt and A. Nicolau in their article "Partitioned Register Files for VLIWs: A Preliminary Analysis of Trade-offs" published in the proceedings of the 25th Annual International Symposium on Microarchitecture, pp. 292-300, December 1992 describes yet another clustered VLIW processor with limited connectivity among clusters, which also needs inter-cluster copy instructions to access registers from remote clusters.

A different type of partitioned register file with an attached caching register buffer structure is described in the Ph.D. thesis entitled "Microarchitectures and Compilation Support for Clustered Instruction-level Parallel Processors", University of Maryland, College Park published in March. 2001 authored by Kailas and in a EuroPar 2002 conference paper entitled "A Partitioned Register File Architecture and Compilation Scheme for Clustered ILP Processors" by Kailas et al. Their technique reduces the number of inter-cluster copy operations by combining several inter-cluster copy instructions into a new single "sendb" instruction which carries out a selective broadcast of register value to caching register buffers associated with the destination clusters. U.S. Pat. No. 6,282,585B1, issued on Aug. 28, 2001 in the name of Batten et al. entitled "Cooperative interconnection for reducing port pressure in clustered microprocessors" describes three techniques to reduce the port requirements of clustered processors—register file replication, duplicating interconnect using multiple global move units, and splitting inter-cluster copy instructions into two sub-instructions. These techniques, however, do not solve the problem of large number of copy instructions required for inter-cluster communication. U.S. Pat. No. 7,114,056, issued on Sep. 26, 2006, in the name of M. Tremblay and W. Joy entitled "Local and global register partitioning in a VLIW processor" describes a register file partitioning scheme for a VLIW processor in which each partition register file is further partitioned into global and local such that global registers are kept coherent across all function units by broadcasting the write operations. While this scheme may help avoid explicit inter-cluster copy operations by using the replicated register file approach to the global registers in each register file, it suffers from all the drawbacks of replicated register file scheme such as large inter-cluster bandwidth and large number of inter-connect paths.

From the above discussion, it follows that all of the prior art suffer from the drawbacks associated with partitioned register files used in clustered VLIW ,processors such as increase in code size due to large number of inter-cluster copy instructions, and performance loss due to inter-cluster copy instructions stretching of critical paths in programs.

SUMMARY OF THE INVENTION

The invention relates to a method and apparatus for providing fast remote register access in a clustered VLIW processor using partitioned register files.

One aspect of the present invention is reduction of the performance penalties due to inter-cluster copy instructions in a clustered VLIW processor using partitioned register files.

In one embodiment of the invention, a preliminary decoding step pre-fetches the contents of remote registers that will be modified in a particular remote cluster from the pipeline bypass network within that remote cluster.

In an alternative embodiment, a preliminary decoding step pre-fetches the contents of remote registers that will not be modified in a particular remote cluster directly from that remote register file.

In another embodiment, the register pre-fetching may be implemented in clustered processors using a pre-fetch instruction buffer and an instruction pre-decoder to identify those instructions that access the remote register file in a pre-fetch instruction buffer. The instruction pre-decoder may be used for generating inter-cluster bypass control signals and remote register access signals.

DETAILED DESCRIPTION

Figure 1:
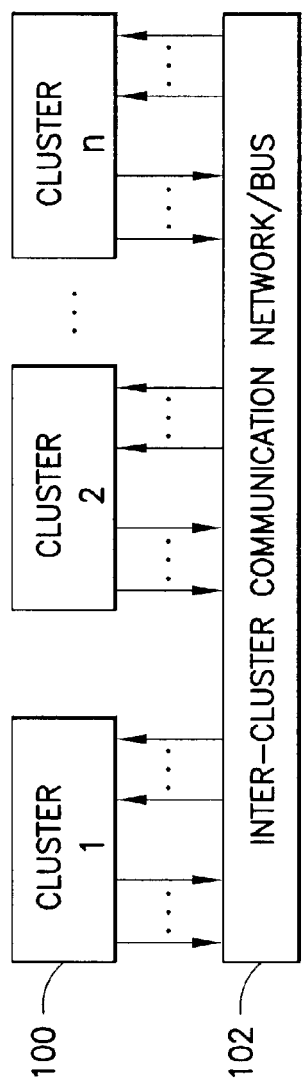
FIG. 1 shows the block schematic of a typical clustered VLIW processor.

The present invention relates generally to register files for clustered Very Long Instruction Word (VLIW) processors, and in particular to partitioned register files in which the register name space is partitioned and assigned to local register files associated with each cluster.

The problems described above and the related problems of the prior art stated above are solved with the principles of the present invention, a method and apparatus for providing fast remote register access in a clustered VLIW processor using partitioned register files. In particular, the present invention helps reduce the performance penalties in a clustered VLIW processor using partitioned register files due to inter-cluster copy instructions.

Effective remote register file access time can be reduced in a clustered VLIW processor using partitioned register files and some additional hardware for pre-fetching remote registers. An instruction pre-fetcher and an instruction pre-decoder are used for pre-fetching and partially decoding instructions in order to pre-fetch the remote registers required for executing VLIWs at run-time, thus substantially reducing the number of inter-cluster copy instructions. The instructions (VLIWs) are scheduled taking into account the various hardware resource constraints such as limited inter-cluster communication bandwidth, inter-cluster communication delay, etc. substantially reducing the number of inter-cluster copy instructions, and thereby reducing the code size and execution time of the programs. It can also reduce the register pressure, and consequently reduce spilling of registers into memory because only one copy of a variable (data) is stored in all the register files compared to replicating the same data in different register files.

A VLIW processor executes VLIWs (very large instruction words) consisting of a set of instructions that can be executed in parallel on different function units or processing pipelines of the processor. A VLIW compiler is used for statically scheduling instructions within a VLIW and also for creating sequences of VLIWs such that processor resources are never over-subscribed. A VLIW may contain inter-cluster copy instructions to move data residing in local registers of one cluster to another.

The present invention is a method and corresponding apparatus that utilizes hardware pre-fetching of remote registers which can potentially eliminate a large number of inter-cluster copy instructions in a clustered VLIW processor using partitioned register file. More specifically, the method consists of scheduling instructions that use remote registers without using explicit inter-cluster copy instructions to access remote registers. The remote register contents are pre-fetched if they are not being overwritten by any of the preceding instructions currently in the processor pipeline. If the contents are going to be overwritten, the datum scheduled to be written to the remote register in question is bypassed to the appropriate destination cluster, using an inter-cluster bypass network.

For example, this network consists of 320, 316 and the line 321 connecting 316 and 306 (denoted collectively by numeral 360). Preferably, the existing inter-cluster communication bus (316, 102) is used for bypassing remote register contents as well, since that bus (316, 102) will be mostly sitting idle once the number of inter-cluster copy operations are reduced (due to the remote register pre-fetching according to the invention). A separate bus or network 360 may be used exclusively for this purpose if the system designer prefers. Line 322 represents the control signals required for pre-fetching directly from the pipeline of the remote source cluster.

The register pre-fetching may be implemented in clustered processors using a pre-fetch instruction buffer and an instruction pre-decoder to identify in the pre-fetch instruction buffer those instructions that access the remote register file.

The instruction pre-decoder may by used for generating inter-cluster bypass control signals and remote register access signals that travel along line 322. Compiler algorithms for statically reserving resources required for inter-cluster communication along multiple execution paths are known in the art, such as those described in the Ph.D. thesis of Krishnan Kailas published in March 2001 at University of Maryland, College Park.

Figure 2:
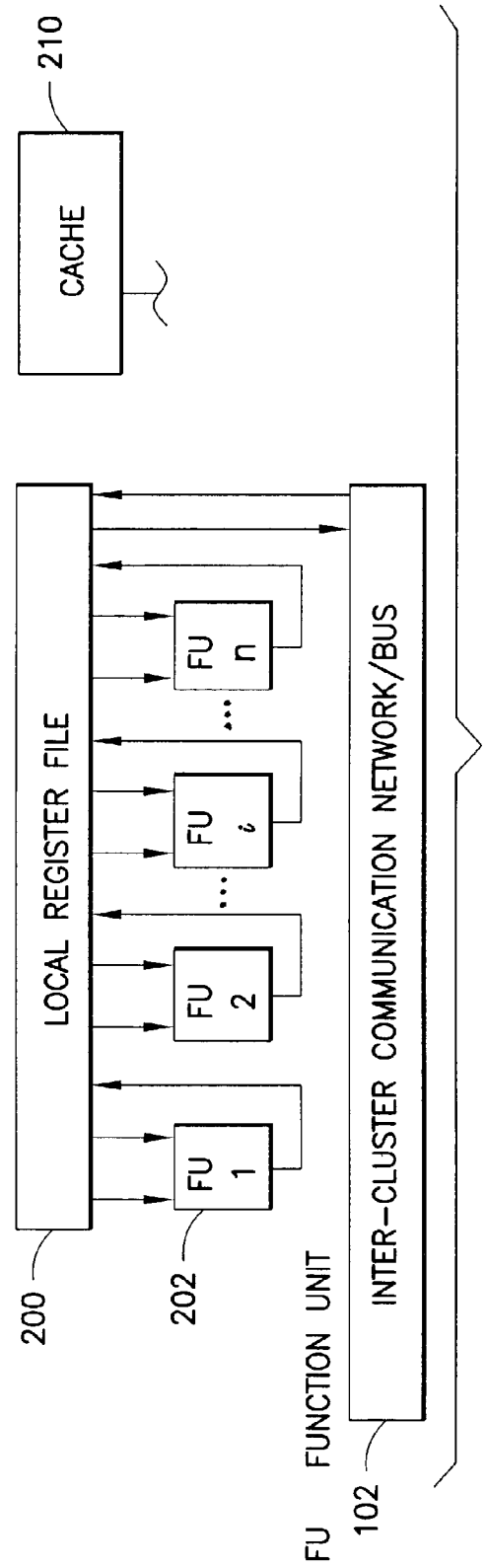
FIG. 2 shows the block diagram of an individual cluster in a clustered VLIW processor.

FIG. 1 shows a typical clustered VLIW processor in the prior art, with one or more clusters 100 interconnected through an inter-cluster communication network or bus structure 102. An individual cluster, as shown in FIG. 2, may have a plurality of function units (FUs) 202 which can directly access (read and write) the local register file 200 in the cluster. Data residing in the local registers of other clusters, usually referred to as "remote registers", may be read/written using the inter-cluster communication network/bus 102.

Each cluster may have a data/instruction cache 210, as well. The remote registers are usually accessed using inter-cluster copy operation in a clustered VLIW processor; e.g. if another cluster wants to access a register within register file 200 in the ith cluster illustrated in FIG. 2, it will use an inter-cluster copy operation. The present invention can eliminate a large number of inter-cluster copy instructions in a clustered VLIW processor using a partitioned register file.

The inter-cluster copy operations are greatly reduced by pre-fetching remote register values required by operations (OPs) within VLIWs, using hardware such as that denoted 302, 302-1, 302-2, 322, 320 and network 360 instead of using inter-cluster copy OPs. Prefetching the necessary source register values directly from the remote register file may not be sufficient in cases when some of those remote registers may be modified by the instructions currently in the pipeline. In such cases, the remote register values have to be pre-fetched directly from the pipeline bypass network of the remote cluster to the required cluster using an inter-cluster bypass network.

Figure 3:
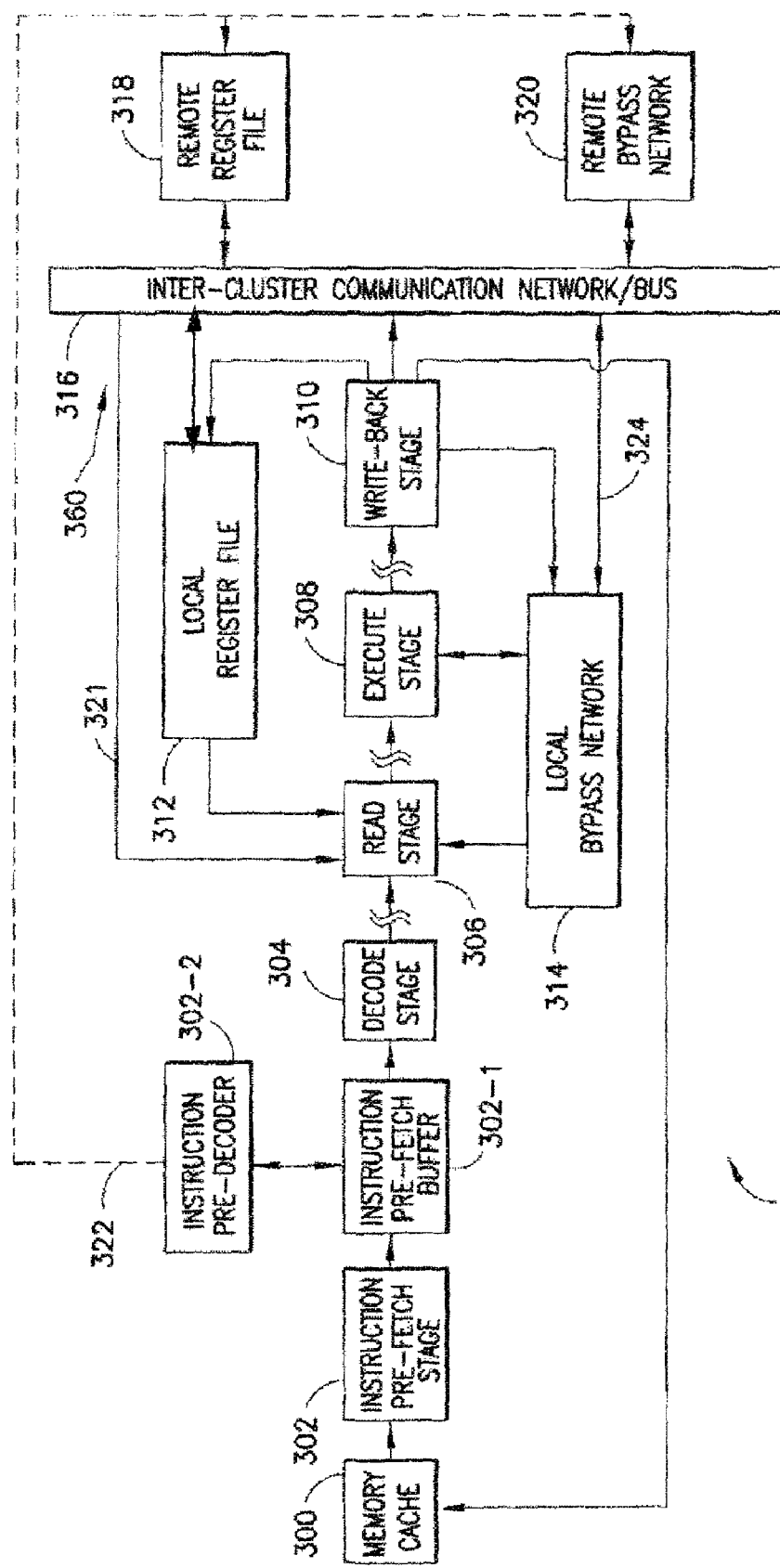
FIG. 3 shows a clustered VLIW processor with instruction pre-fetcher and instruction pre-decoder according to the present invention.
Figure 4:
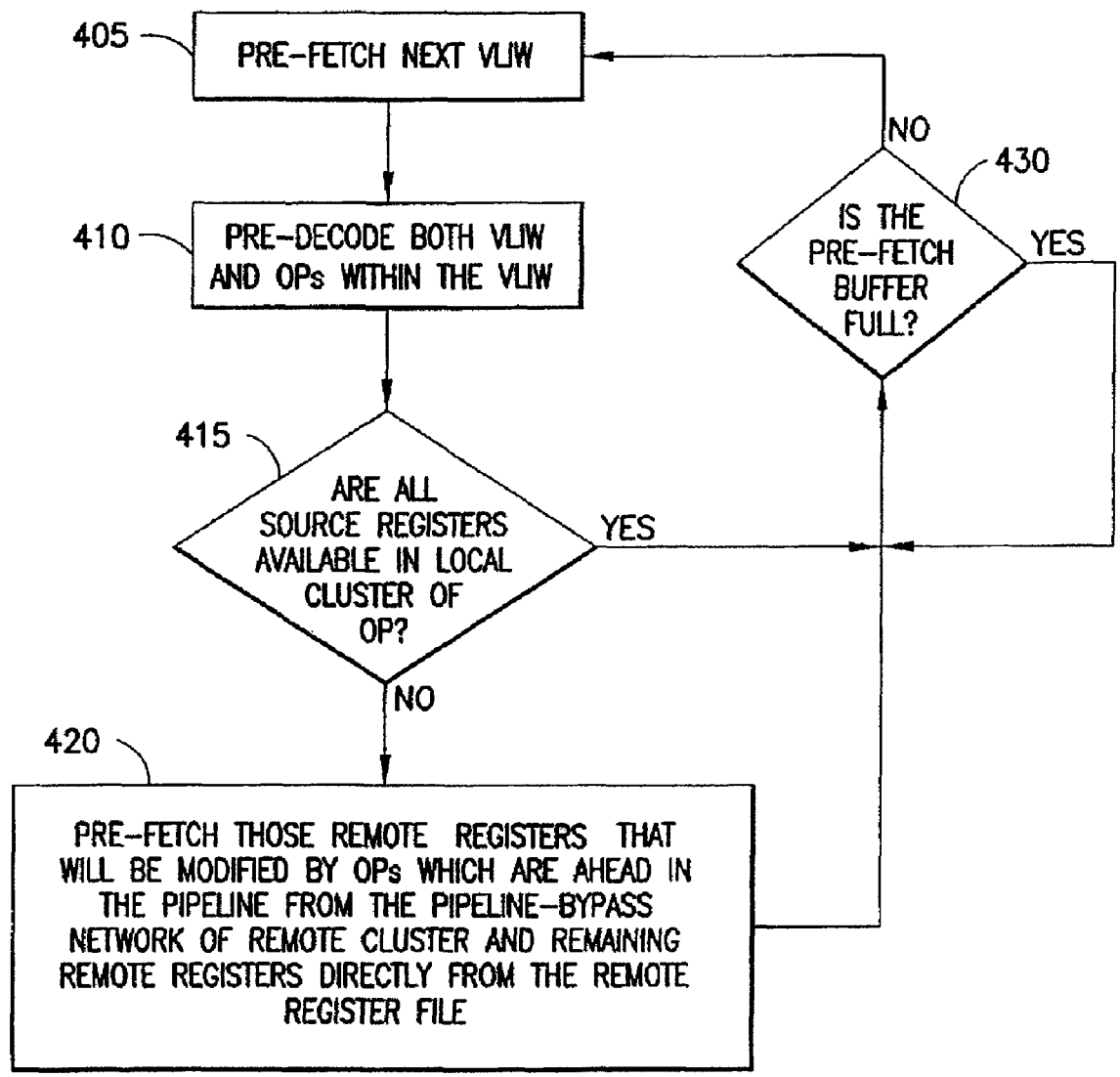
FIG. 4 shows a flow diagram illustrating steps according to the present invention.

The flow-chart shown in FIG. 4 describes the various steps of the method described above. A clustered VLIW processor configuration required for supporting the above mentioned scheme is shown in FIG. 3. The diagram is for illustration purposes only; for example, the processor pipeline shown in the FIG. 3 may have additional stages. Moreover, each one of the pipeline stages may be further pipelined and implemented as a number of stages determined by the clock frequency requirement of processor. Instructions and data reside in memory or cache. An instruction pre-fetch unit 302 is used for fetching the instructions from the memory into an instruction pre-fetch buffer 302-1.

The data path for instructions prefetched is the line from 300 to 302, and 302 to 304 via instruction pre-fetch buffer 302-1; the pre-fetched instruction goes into a pre-fetch buffer and from there first to a pre-decode stage 302-2 and then to the traditional decode stage 304.

Line 322 represents the path for the control signals used to pre-fetch the remote registers from the remote register file 318 or the remote bypass network 320. This hardware network is formed from conventional elements. Those skilled in the art are well aware of construction techniques for accessing such remote clusters using on-chip shared or point-to-point buses.

According to the invention, remote register access time is reduced by bypassing a remote register content directly from the local pipeline bypass network of a remote cluster without the help of an inter-cluster copy instruction. In prior art, a remote register content was only accessible through an inter-cluster copy instruction, which first reads the register contents (either directly from the register file or using the local pipeline bypass network), and then sends it over the inter-connect 316 to other cluster(s). Reducing this 2 (or more) steps access to one step by directly pre-fetching the register contents can help reduce remote register access time.

A dedicated inter-connect network consisting of a shared or point-to-point bus can indeed provide more bandwidth for transferring register contents across clusters (at the cost of extra hardware required for implementing it). On the other hand, the existing inter-cluster communication network can also be used for this purpose. Bus access control and arbitration (solved by bus technology) are required if the bus is a shared one; point-to-point links do not require it (at the cost of more wires and chip area). The instruction pre-fetch buffer 302-1 should be large enough to hold instructions belonging to a sufficiently large number of cycles, such that by the time an instruction reaches the read stage, all the data required by the instruction can be pre-fetched and made ready for use. Referring again to FIG. 3, an instruction pre-decoder 302-2 is used to decode the instructions to find out the registers used by them and to identify instructions that access the remote register file.

The instruction pre-decoder 302-2 also generates appropriate control signals to initiate data transfer from remote clusters. If the required remote register is not yet written back to the register file 318 by an instruction in the pipeline, then unit 302-2 generates appropriate control signals 322 to bypass the remote register data directly from one cluster (the cluster containing register file 318) to another one 350 (illustrated in FIG. 3) using the inter-cluster communication network/bus 316.

The compiler, by scheduling data dependent instructions sufficiently far apart, guarantees that the instructions that produce register values can always feed the instructions that consume them using the above mentioned hardware. The schedules generated by the compiler therefore have to explicitly take into account latency of inter-cluster communication network/bus, size of the instruction prefetch buffer, pipeline depth, etc., so that data will be available by the time an instruction that uses the data reaches execution stage of the pipeline. One may use the compiler algorithms for instruction scheduling technique described in Kailas' Ph.D. thesis, University of Maryland, March 2001 for statically reserving resources required for inter-cluster communication along multiple execution paths.

In the remainder of FIG. 3, decode stage 304 performs the decoding of the current instruction(s) which may be more comprehensive than the decoding performed in the pre-decode 302, since the pre-decode only needs to decode the register operands used by an instruction. The read stage 306 brings in the required data for computation from memory and/or register files. The execute stage 308 performs the actual operations specified by the instruction (such as an addition or multiplication operation) and the write-back stage 310 moves data back to be used again into the local bypass network 314, and to the local register file 312 or the cache 300 as specified by the instruction. Data required to be sent out to other clusters in the total system will also pass through the write-back stage 310 on their way to the bus 316.

FIG. 4 is a flow diagram illustrating steps involved in pre-fetching of remote registers ahead of their use. Step 405 starts the sequence of pre-fetching the next instruction (VLIW).

Step 410 pre-decodes the VLIW and operations within the VLIW, checking what resources are required. In particular, if all source registers are available in the local cluster, the sequence loops back to start on the next instruction, subject to a pause if the pre-fetch buffer is full (Step 430).

If some registers are not available, Step 420 starts an operation in which the remote registers are pre-fetched from either the remote register file if the data will not be overwritten, or the pipeline bypass network of the remote cluster if the data will be overwritten by a preceding instruction in the pipeline of a remote cluster.

While the invention has been described in terms of a single preferred embodiment, those skilled in the art will recognize that the invention can be practiced in various versions within the spirit and scope of the following claims.

What is claimed is:

1. A computer system, comprising:
a plurality of clustered processing cores for processing VLIW (Very Long Instruction Word) operations, wherein each processing core comprises:
a local partitioned register file having a subset of an architected name space;
an instruction decoder to decode a VLIW for execution;
an inter-cluster communication bus enabling communication between the processing cores;
a processor pipeline including a plurality of stages for operating on the VLIW; and
a hardware register pre-fetch unit comprising an instruction pre-fetch buffer to store the VLIW to await decoding by the instruction decoder,
wherein the hardware register pre-fetch unit (i) pre-decodes a name of a register specified in the VLIW in advance of decoding by the instruction decoder to determine if a remote register is needed to execute the VLIW, and (ii) generates a control signal to pre-fetch data, from the specified remote register in a remote processing core or from a remote bypass network, for an instruction along one execution path in a program, in advance of decoding of the VLIW by the instruction decoder for execution, based on a compiler analysis of the program that schedules instructions that are data dependent by taking into account a latency of the inter-cluster communication bus, a size of the instruction pre-fetch buffer, and a depth of the processor pipeline.

2. The computer system of claim 1, wherein the hardware register pre-fetch unit generates a control signal to pre-fetch a remote register directly from a local partitioned register file of a remote processing core.

3. The computer system of claim 1, wherein the hardware register pre-fetch unit generates a control signal to pre-fetch a remote register directly from a local bypass network of a remote processing core.

4. The computer system of claim 1, wherein the hardware register pre-fetch unit pre-decodes the VLIW to identify a remote register of a remote processing core, if any, that will be modified by operations performed in a remote processing core before the decoding and execution of the VLIW, and generates the control signal to directly pre-fetch the modified remote register from a local bypass network of the remote processor core.

5. The computer system of claim 1, wherein the hardware register pre-fetch unit pre-decodes the VLIW by partially decoding a register operand used by the VLIW.

6. The computer system of claim 1, wherein the remote register is pre-fetched by means of a hardware path that is separate from the inter-cluster communication bus.

7. The computer system of claim 1, wherein the hardware register pre-fetch unit of each processing core comprises:
an instruction pre-fetch unit to pre-fetch the VLIW to be executed; and
an instruction pre-decoder unit that performs the pre-decoding of the VLIW in the instruction pre-fetch buffer in advance of decoding by the instruction decoder.

8. The computer system of claim 1, wherein each processing core further comprises:
a read stage; and
a data bus operatively connecting the read stage to the inter-cluster communication bus,
wherein the remote register pre-fetched from a remote processing core is directly pre-fetched to the read stage via the data bus from the inter-cluster communication bus.

9. A method for processing VLIW (Very Long Instruction Word) operations in a clustered VLIW processor having a plurality of clustered processing cores with partitioned register files, a processor pipeline including a plurality of stages for operating on the VLIW, an inter-cluster communication bus enabling communication between the processing cores, and an instruction pre-fetch buffer to store the VLIW to await decoding by an instruction decoder, each partitioned register file having a non-intersecting subset of an architected name space, the method comprising:
passing a VLIW to a local processing core for decoding and execution of the VLIW by the local processing core;
pre-decoding a name of a register specified in the VLIW by the local processing core to determine if a remote register is needed to execute the VLIW; and
generating a control signal by the local processing core for pre-fetching data, from the specified remote register in a remote processing core or from a remote bypass network, for an instruction along one execution path in a program,
wherein the pre-decoding and pre-fetching are performed in advance of decoding of the VLIW by the local processing core, based on a compiler analysis of the program that schedules instructions that are data dependent by taking into account a latency of the inter-cluster communication bus, a size of the instruction pre-fetch buffer, and a depth of the processor pipeline.

10. The method of claim 9, wherein the control signal is generated for pre-fetching a remote register directly from a local partitioned register file of a remote processing core.

11. The method of claim 9, wherein the control signal is generated for pre-fetching a remote register directly from a local bypass network of a remote processing core.

12. The method of claim 9, wherein pre-decoding the VLIW is performed to identify a remote register of a remote processing core, if any, that will be modified by operations performed in a remote processing core before the decoding and execution of the VLIW, and wherein the control signal is generated for pre-fetching the modified remote register from a local bypass network of the remote processor core.

13. The method of claim 12, further comprising scheduling the VLIW and sub-instructions within the VLIW at intervals that allow the modified remote register to be pre-fetched from a remote processing core after the remote register has been modified and before a corresponding instruction of the VLIW has started to execute.

14. The method of claim 9, wherein pre-decoding of the VLIW comprises partially decoding a register operand used by the VLIW.

15. A program storage device tangibly embodying a program of instructions that are executable to perform method steps for operating a clustered VLIW processor having a plurality of clustered processing cores with partitioned register files, a processor pipeline including a plurality of stages for operating on the VLIW, an inter-cluster communication bus enabling communication between the processing cores, and an instruction pre-fetch buffer to store the VLIW to await decoding by an instruction decoder, each partitioned register file having a non-intersecting subset of an architected name space, the method steps comprising:
passing a VLIW to a local processing core for decoding and execution of the VLIW by the local processing core;
pre-decoding a name of a register specified in the VLIW by the local processing core to determine if a remote register is needed to execute the VLIW; and
generating a control signal by the local processing core for pre-fetching data, from the specified remote register in a remote processing core or from a remote bypass network, for an instruction along one execution path in a program,
wherein the pre-decoding and pre-fetching are performed in advance of decoding of the VLIW by the local processing core, based on compiler analysis of the program that schedules instructions that are data dependent by taking into account a latency of the inter-cluster communication bus, a size of the instruction pre-fetch buffer, and a depth of the processor pipeline.

16. The program storage device of claim 15, wherein the instructions for generating a control signal comprise instructions for generating a control signal for pre-fetching a remote register directly from a local partitioned register file of a remote processing core.

17. The program storage device of claim 15, wherein the instructions for generating a control signal comprise instructions for generating a control signal for pre-fetching a remote register directly from a local bypass network of a remote processing core.

18. The program storage device of claim 17, wherein the instructions for pre-decoding the VLIW comprises instructions for identifying a remote register of a remote processing core, if any, that will be modified by operations performed in a remote processing core before the decoding and execution of the VLIW, and generating a control a control signal for pre-fetching the modified remote register from a local bypass network of the remote processor core.

19. The program storage device of claim 18, further comprising instructions for scheduling the VLIW and sub-instructions within the VLIW at intervals that allow the modified remote register to be pre-fetched from a remote processing core after the remote register has been modified and before a corresponding instruction of the VLIW has started to execute.

20. The program storage device of claim 15, wherein the instructions for pre-decoding the VLIW comprise instructions for partially decoding a register operand used by the VLIW.

\* \* \* \* \*